United States Patent
Siomina et al.

(10) Patent No.: US 8,848,561 B2
(45) Date of Patent: Sep. 30, 2014

(54) AUTONOMOUS MAXIMUM POWER SETTING BASED ON CHANNEL FINGERPRINT

(75) Inventors: Iana Siomina, Solna (SE); Muhammad Kazmi, Bromma (SE); Gary Boudreau, Kanata (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 219 days.

(21) Appl. No.: 13/384,854

(22) PCT Filed: Dec. 28, 2011

(86) PCT No.: PCT/SE2011/051596
§ 371 (c)(1),
(2), (4) Date: Sep. 17, 2012

(87) PCT Pub. No.: WO2012/138274
PCT Pub. Date: Oct. 11, 2012

(65) Prior Publication Data
US 2013/0039194 A1 Feb. 14, 2013

Related U.S. Application Data

(60) Provisional application No. 61/472,035, filed on Apr. 5, 2011.

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04B 7/185 | (2006.01) | |
| H04W 4/00 | (2009.01) | |
| H04W 52/24 | (2009.01) | |

(52) U.S. Cl.
CPC ............... *H04W 52/244* (2013.01); *Y02B 60/50* (2013.01)
USPC ............ 370/252; 370/318; 370/328; 370/338

(58) Field of Classification Search
None
See application file for complete search history.

(56) References Cited

U.S. PATENT DOCUMENTS

| | | | | |
|---|---|---|---|---|
| 2002/0114295 | A1* | 8/2002 | Takahiro et al. | 370/329 |
| 2010/0035628 | A1* | 2/2010 | Chen et al. | 455/452.2 |
| 2011/0086663 | A1* | 4/2011 | Gorokhov et al. | 455/522 |
| 2011/0286346 | A1* | 11/2011 | Barbieri et al. | 370/252 |

OTHER PUBLICATIONS

3GPP TS 25.104 V8.11.0, 3rd Generation Partnership Project; Technical Specification Group Radio Access Network; Base Station (BS) radio transmission and reception (FDD) (Release 8), (Sep. 2010).
3GPP TS 36.104, V8.11.0, 3rd Generation Partnership Project; Technical Specification Group Radio Access Network, Evolved Universal Terrestrial Radio Access (E-UTRA) and Evolved Universal Terrestrial Radio Access (E-UTRAN); Base station (BS) radio transmission and reception (Release 8), (Jun. 2010).

* cited by examiner

*Primary Examiner* — Faruk Hamza
*Assistant Examiner* — Diane Lo
(74) *Attorney, Agent, or Firm* — Baker Botts L.L.P.

(57) ABSTRACT

A home base station (HBS) (104, 801) performs radio channel measurements to detect one or more user equipments (UEs) (107) not served by the HBS which may be in a potentially interfering environment caused at least in part by the HBS. A database (812) of historical channel data (channel fingerprinting) of the HBS coverage area is used to predict the channel conditions and expected interference signal power seen by the detected UE(s). Based on a combination of the radio measurements (813) and historical channel data, the HBS can accurately and adaptively reduce its transmit power to a level that reduces or eliminates interference with the detected UE(s), while also not significantly degrading communication quality between other UEs served by the HBS.

31 Claims, 5 Drawing Sheets

AUTONOMOUS MAXIMUM POWER SETTING BASED ON CHANNEL FINGERPRINT

This application is the U.S. national phase of International Application No. PCT/SE2011/051596 filed 28 Dec. 2011 which designated the U.S. and claims priority to U.S. Provisional Application No. 61/472,035 filed 5 Apr. 2011, the entire contents of each of which are hereby incorporated by reference.

TECHNICAL FIELD

The technology relates to radio communications, and in particular, to mitigating radio signal interference.

BACKGROUND

An ever increasing demand for higher cellular network data rates raises the challenging question for operators of how to evolve their existing cellular networks to meet this demand. In this regard, a number of approaches are possible: i) increase density of typical macro (large, high power) base stations, ii) increase cooperation between macro base stations, or iii) deploy smaller lower power base stations as an overlay to a macro cellular network in areas where high data rates are needed within the macro network topology.

The 3rd Generation Partnership Project (3GPP) provides technical specifications for a 3rd generation mobile system based on evolved Global System for Mobile Communications (GSM) core networks. In 3GPP, the last option (iii) is commonly referred to as a "Heterogeneous Network" or "Heterogeneous Deployment." Lower power base station nodes are referred to by a variety of names including "micro", "pico", "femto" or "home" base stations (HBS) depending on transmit power and targeted coverage of the low power nodes. Specifically, deployment of femto base stations, or home eNBs (HeNB using LTE terminology), can lead to greater local coverage and throughput, e.g., for in-building users.

HeNB's are often deployed using a closed subscriber group (CSG) in order to restrict authorized users of the HeNB to an identified and approved set of users or user equipment (UE). When closed subscriber group home base stations (CSG HeNB's) are deployed as an overlay to an existing macro cellular network deployment, macro network UEs (MUEs) that are not part of the CSG can be adversely affected by the CSG HeNB. For example, macro user equipment which is not part of the closed subscriber group (non-CSG MUE) but is near or in the coverage area of the CSG HeNB may receive interference from the CSG HeNB. A non-CSG MUE near an edge of its macro cell coverage and receiving a relatively weak downlink (DL) signal from its macro cell base station (e.g., eNB), while simultaneously being close to an CSG HeNB and receiving a relatively strong interfering DL signal from the CSG HeNB, results in reduced DL throughput for the non-CSG MUE. Reduced DL throughput may lead to loss of coverage depending on the strength of the CSG HeNB interferer.

A number of potential approaches may mitigate the interference to non-CSG MUEs within the coverage area of CSG HeNB's. In a CSG HeNB deployment, one approach is to handover the non-CSG MUE from the macro eNB to the HeNB and thus let the non-CSG MUE be served by the CSG HeNB. In a typical CSG HeNB deployment, however, a handover of non-CSG MUEs is generally not possible as the non-CSG MUE is not part of the CSG. Another possible approach employs a form of autonomous power control of the CSG HeNB transmit power based on the received signal power from the non-CSG MUE or on the strongest co-channel interferer as seen by the HeNB. Lastly, another possible approach is to have the HeNB avoid scheduling its UEs on the same radio bearers (RBs) as the non-CSG MUE that is in close proximity to the CSG HeNB. This approach can effectively mitigate the interference but reduces the capacity of the HeNB.

These approaches may potentially reduce the interference and outage as seen by the non-CSG MUEs. However, the CSG HeNB has no direct knowledge of radio bearers (RBs) that non-CSG MUEs are scheduled on or an actual level of interference that the non-CSG MUE is receiving. The received signal strength received from the non-CSG MUE in the uplink (UL) at the CSG HeNB is different from the strength of a DL signal received from the CSG HeNB at the non-CSG MUE, e.g., because of different transmit power levels of base stations and UEs which may also be dynamically controlled. It is therefore difficult for the CSG HeNB to accurately adjust its power to sufficiently reduce the interference to the non-CSG MUE without reducing received signal power as seen by UEs served by the CSG HeNB. In addition, this reduction in received signal power potentially reduces communication quality of the CSG HeNB UEs (HUEs).

What is needed is an approach that can accurately predict channel conditions and expected interference signal power encountered by non-CSG user equipment affected by a CSG node.

SUMMARY

A home base station (HBS) performs radio channel measurements to detect one or more user equipments (UEs) not served by the HBS which may be in a potentially interfering environment caused at least in part by the HBS. A database of historical channel data (channel fingerprinting) of the HBS coverage area is used to predict the channel conditions and expected interference signal power seen by the detected UE(s). Based on a combination of the radio measurements and historical channel data, the HBS can accurately and adaptively reduce its transmit power to a level that reduces or eliminates interference with the detected UE(s), while also not significantly degrading communication quality between other UEs served by the HBS.

In example embodiments, a method and apparatus are disclosed for reducing interference from a first network node transmitting a radio signal at a first output power level in a first cell. One or more radio measurements are performed in the first cell on an uplink (UL) radio signal transmitted by one or more user equipments (UEs) served by a second radio network node and on a downlink (DL) radio signal transmitted by the second radio network node. One of the one or more UEs served by the second radio network node is identified as experiencing interference from a DL transmission from the first radio network node based on the one or more performed radio measurements. An interference experienced by the identified UE and caused by the DL transmission from the first radio network node is estimated based on the one or more performed radio measurements. The first output power level of the first radio network node is modified based on the estimated interference to reduce the interference caused by the first radio base station and experienced by the identified UE.

In one example implementation, the estimation is also based on historical radio data obtained for the first cell which includes signal strength and/or signal quality measurements experienced by UEs served by the first radio base station.

In one example aspect, the historical radio data is created for the first cell by aggregating over time one or more of the following data: one or more measurements related to UL signals transmitted by UEs served by the first radio base station; one or more measurements related to DL signals for UEs served by the first radio base station; one or more measurements related to DL signals for UEs served by neighboring base stations; measurements related to DL signals for UEs served by the second radio base station, or positioning information of UEs served by the first radio base station. The historical radio data may be dynamically maintained for the first cell in a database by periodic updating including triggers, such as: a periodic update initiated by the first radio base station; identification of an active UE served by the first radio base station; detecting a change in physical location or geographical proximity of the first radio base station; the first radio base station receiving instructions to update; or the first radio base station receiving historical radio data for the first cell generated externally to the first radio base station.

In one example implementation, the externally-generated historical radio data for the first cell includes simulations of signal strength and/or signal quality measurements associated with UEs served in the first radio base station based on location data and/or logged data.

For one example embodiment, a fingerprint database stores a historical relationship of measured neighboring radio base station DL signals received by UEs served by the first radio base station and signals between UEs served by the first radio base station and the first radio base station.

The estimating step in one example embodiment includes one or more of: performing a regression analysis, building one or more interpolation functions, or matching the measurements to an RF pattern.

One or more threshold targets may be set to maintain a specified quality of a DL signal transmitted by the second radio base station and received by the identified interfered UE.

In one example application, the first radio network node is a home base station serving a closed subscriber group, the second radio network node is a macro base station, and the identified interfered UE is a macro base station user equipment (MUE) served by the macro base station and is not part of the closed subscriber group. Alternatively, the first radio network node may be a low power home base station and the identified interfered UE is a macro base station user equipment (MUE) not served by the low power home base station.

In one aspect of the example embodiment, the first radio base station identifies a first cell identifier associated with the first radio base station associated a first class of radio network nodes and a second cell identifier associated with the identified interfered UE. The first radio base station compares the first cell identifier to the second cell identifier to determine if the second radio base station belongs to a second class of radio network nodes. The second class of radio network nodes may be for example a higher-output power class, compared to the first class of radio network nodes, and the second class of radio network nodes may be wide area radio base stations.

In one aspect of the example embodiment, the identifying step further comprises identifying a second cell identifier based on reading the broadcast channel or performing measurements on downlink signals transmitted by the second radio network node.

The identifying step described above can be repeated for a plurality of interfered UEs and then be followed by a selecting step to select a specific interfered UE from the plurality of interfered UEs based on a measured, low quality, downlink (DL) radio signal below a defined threshold, transmitted by the second radio base station. Alternatively, a specific interfered UE from the plurality of interfered UEs may be selected based on measurements in the first cell on an uplink (UL) radio signal transmitted by one or more user equipments (UEs) served by the second radio base station.

In one example implementation, further modification of the first radio base station output power is discontinued when the identified UE is no longer being interfered.

DETAILED DESCRIPTION

Figure 1:
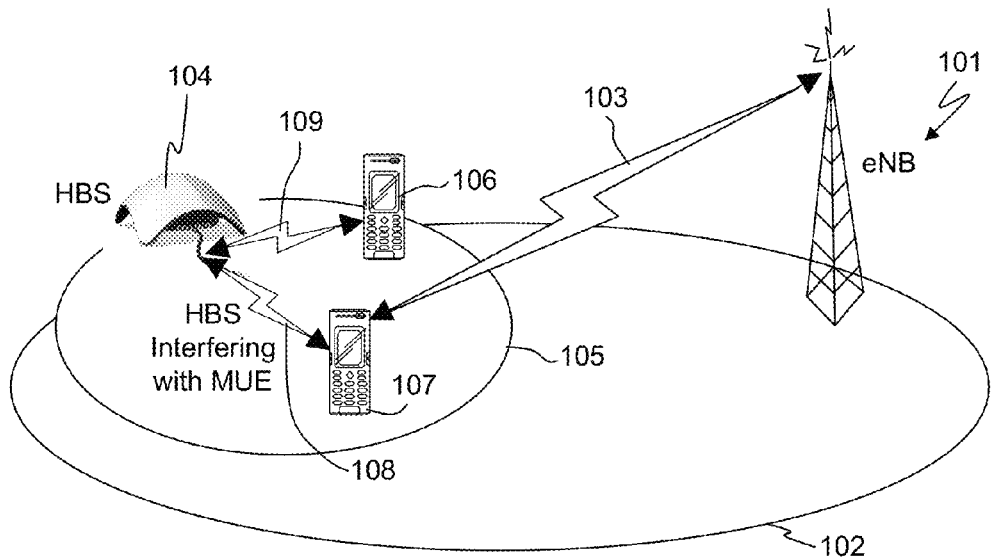
FIG. 1 illustrates a non-CSG MUE in an interfering environment with a DL transmission of a CSG HeNB.

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (AS IC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The following terminologies are used in the disclosure for consistency and simplicity. The technology described herein may apply to a heterogeneous network comprising network nodes using any technology including, e.g., UMTS, WCDMA, high speed packet access (HSPA), long term evolution (LTE), WiMax, code division multiple access (CDMA) 2000, GSM, etc. or a mixture of technologies such as with a multi-standard radio (MSR) node (e.g., LTE/HSPA, GSM/HS/LTE, CDMA2000/LTE, etc). Furthermore the technology described herein may apply to different types of nodes, e.g., base station, eNode B, Node B, relay, base transceiver station (BTS), donor node serving a relay node (e.g., donor base station, donor Node B, donor eNB), supporting one or more radio access technologies. General terms macro network node or simply macro node (MN) and home BS (HBS) may be used. Furthermore, instead of using CSG, a more general term, HBS with restricted access may be used. Hence, a CSG node or a CSG low power node (LPN) may be viewed as a special case of an HBS with restricted access. The terms HBS and HBS with restricted access may be used interchangeably, but both refer to the same type of node. A macro node, such as a macro BS, is also called a wide area BS, which serves users in a macro cell. Example wide area and home BS power classes are defined for HSPA and LTE in 3GPP TS 25.104 and 36.104, respectively. A macro node or macro BS is not limited to a wide area BS power class, but rather may refer to any BS class other than the HBS. For simplicity, the terms macro BS or macro node are used. The terms home UE (HUE) and macro UE (MUE) denote user equipment, wireless devices, terminals or even small nodes (e.g., fixed relays, mobile relays, terminal acting as relay etc) which are camped on or connected to or served by the HBS and MN, respectively.

Two factors that predict with a relatively high probability that a non-CSG MUE DL signal from a macro node (e.g., eNB) may be interfered with by an HBS DL signal (and the other way around) are: (1) the non-CSG MUE is near a cell edge of the macro node coverage and (2) the non-CSG MUE is near or in the coverage area of the HBS. This situation is shown in FIG. 1.

In FIG. 1, a macro node (eNB) 101 has a cell coverage area 102 and provides service to an MUE 107. The macro node cell coverage area 102 partially overlaps, or alternatively, fully envelopes a home base station (HBS 104) cell coverage area 105. The HBS 104 serves an HUE 106 and attempts to provide service through DL communication signals (DL/UL 108) to the MUE 107 as MUE 107 is within HBS 104's coverage area. MUE 107 Residing at or near the edge of cell coverage 102, the MUE 107 communicates with macro node 101 through downlink/uplink (DL/UL) communication signals 103. As MUE 107 migrates away from macro node 101 and into the HBS cell coverage area 105, the downlink signal transmission quality 103 deteriorates and potential interference from the HBS 104 downlink (DL) signal 108 increases.

The coverage area of a HBS is, in general, small compared to that of a macro cell. If the HBS detects the presence of a non-CSG MUE within its coverage area and/or the HBS recognizes that the HBS itself is located near the macro cell edge, then the MUE interference scenario shown in FIG. 1 will occur with high probability.

Figure 2:
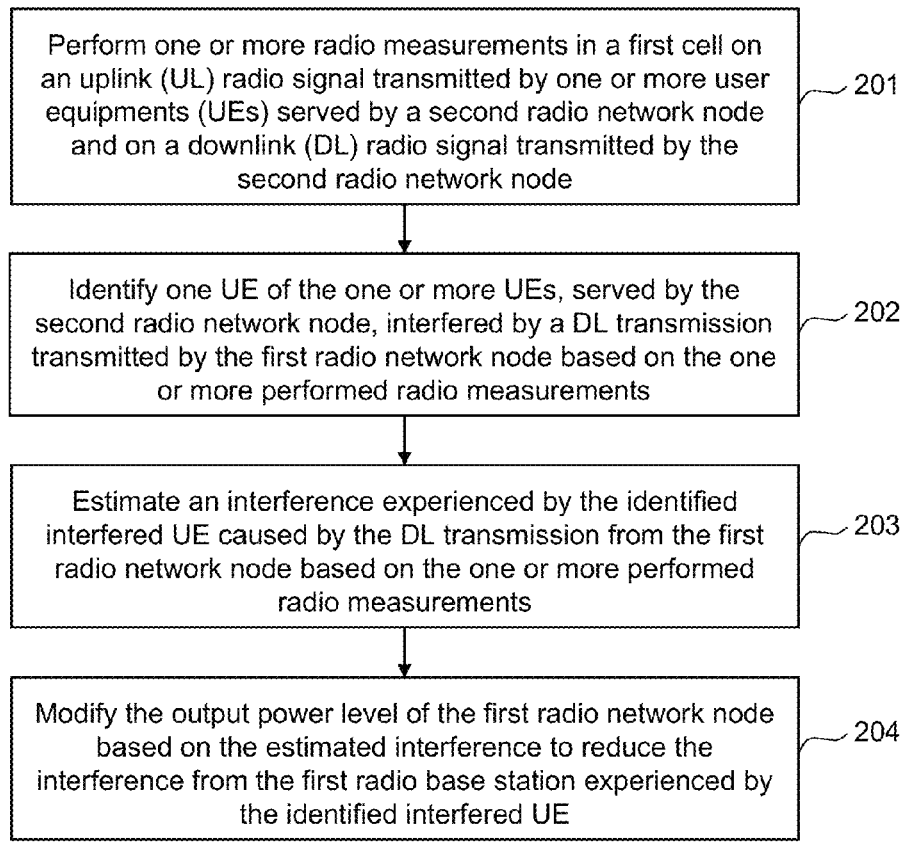
FIG. 2 is a non-limiting example flow chart illustrating modification of output power based on an estimated interference.

FIG. 2 illustrates a flow diagram of one non-limiting embodiment to reduce the effect of HBS interference on UEs served by neighboring nodes. In step 201, a first radio network node (e.g., HBS 104) performs one or more radio measurements (described hereafter) in a first cell (e.g., 105) on an uplink (UL) radio signal (e.g., DL/UL 108) transmitted by one or more user equipments (UEs), e.g., MUE 107, served by a second radio network node and on a downlink (DL) radio signal (e.g., 103) transmitted by the second radio network node (e.g., 101). The first radio network node identifies in step 202 one of the one or more UEs served by the second radio network node that is interfered by (experiences interference caused by) a DL transmission transmitted by the first radio network node based on the one or more performed radio measurements. In step 203, the first radio network node estimates an interference experienced by the identified interfered UE caused by the DL transmission from the first radio network node based on the one or more performed radio measurements. Then, in step 204, the first radio network node modifies (e.g., lowers) its radio signal transmission power level (output power) based on the estimated interference to reduce the interference from the first radio base station experienced by the identified UE.

Figure 3:
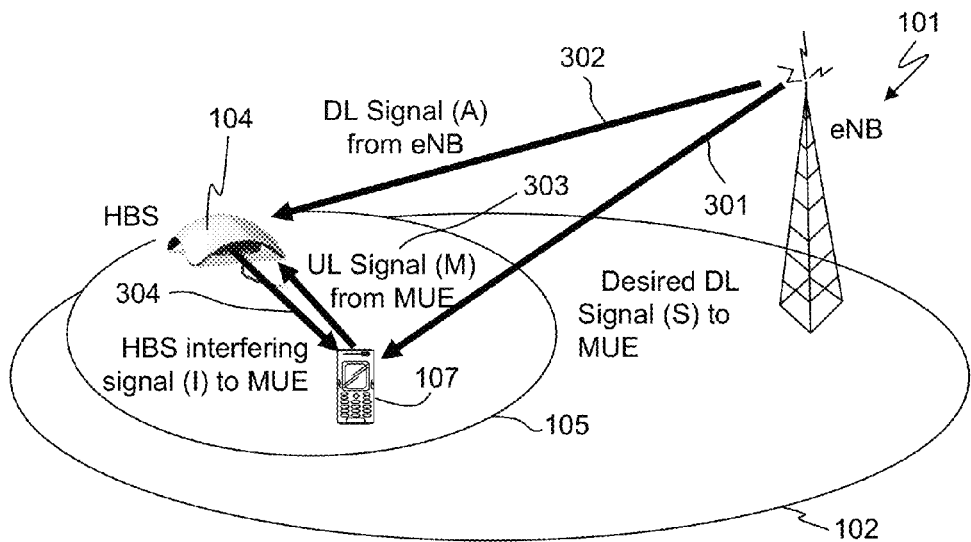
FIG. 3 illustrates an HBS measuring signal strength on a DL signal sent from a macro node.

FIG. 3 is a radio network diagram that illustrates an example of the steps performed in FIG. 2. In this non-limiting example, a home base station (HBS) measures signal strength on a DL signal sent from a macro node and/or considers information such as a physical cell identifier PCI or cell specific reference signals (CRS) to determine the identify of the macro node. In addition, the HBS measures signal strength of UL signals from a MUE not being served by the HBS. More specifically, the downlink signal 304 from the HBS 104 interferes with MUE 107. In an effort to reduce this interference, the HBS 104 measures the strength (power) of two radio signals: an uplink signal (UL 303) from MUE 107 and a downlink signal (DL 302) from the macro node (eNB 101) to the HBS 104. The measured signals are used to estimate (as described hereafter) the interference experienced by MUE 107 caused by the downlink signal 304 from HBS 104. An output power (radio signal transmission power) of HBS 104 may be modified (e.g., lowered) to ensure a higher quality downlink signal (DL 301) from macro node 101.

In the situation where the home base station (HBS) is a closed subscriber group (a CSG HeNB)) and the MUE is a not part of this subscriber group, the CSG HeNB has no direct knowledge of radio bearers (RBs) that non-CSG MUEs are scheduled on or an actual level of interference that the non-CSG MUE is receiving from the CSG home base station. It is therefore difficult for the CSG HeNB to accurately adjust its power to sufficiently reduce the interference to the non-CSG MUE without reducing received signal power as seen by UEs served by the CSG HeNB. Initially, the CSG HeNB determines the presence of a strong, in terms of downlink (DL) signal strength, macro node, e.g., a macro eNB, and its identification, e.g., a physical cell identifier (PCI). The CSG HeNB also determines the presence of a strong, in terms of uplink (UL) signal strength, MUE within the vicinity of the CSG HeNB and in an interfering relationship. The HeNB compares a macro node PCI and a PCI used by the MUE's UL signal transmission. From here, the HeNB more accurately estimates the interference experienced by the non-CSG MUE as further described below.

In a non-limiting embodiment, the HBS corresponding to the CSG HeNB maintains a channel fingerprint database that stores historical UL measurements performed by the HBS on signals transmitted by UEs belonging to its closed subscriber group (HUEs), historical DL signals measurements performed by HUEs, and/or historical DL measurements performed by the HBS on macro node DL signals. The HBS estimates a non-CSG MUE DL signal quality using the one or more previously-described measurements in combination with information stored in a predetermined channel fingerprint database (measurements at the time of estimation), and based thereon, adjusts the HBS maximum output power in order to ensure that MUE DL signal quality (e.g., DL 301) remains within a desired target signal to interference plus noise ratio (SINR).

This channel fingerprint database provides an estimate of the ratio of a desired signal (S) 301 from the macro node to interference (I) 304 from the HBS, which is a direct measure of the quality of the signal seen by the MUE 107 as shown in FIG. 3. The ratio of S to I can be directly related to the achievable throughput that is attainable by the MUE. The HBS has no direct way of measuring the interfering signal I 304 as seen by the MUE because the HBS is operating in a CSG mode. The MUE does not belong to that CSG, and thus, cannot directly communicate this information to the HBS.

The HBS derives an accurate measurement of the signal strength (I) as seen by the MUE using a database of the channel fingerprint data, e.g., created and/or maintained by the HBS based on RF measurements (e.g., received signal strength or path loss) of received signals from its served HUEs. In one non-limiting example, the HBS measures and stores the following sets of measurements: received signal strength of its HUE uplink transmissions, a channel response corresponding to the UL HUE transmissions, and HUE DL received signal strength and downlink channel response as seen by the HUE for each of these transmissions. The HBS may also store the DL measurements of HUEs for neighbor cells.

Example fingerprint measurements include: an RF measurement (e.g., transmit power, received interference), a baseband measurement (e.g., BLER), a timing measurement (e.g., propagation delay, round trip time, transmit—receive time difference etc), or an angle of arrival. A fingerprint may also be associated with a position. Position information of HUE's served by the HBS may be collected, e.g., with drive testing, when the HUE reports measurements and may also include available positioning information. The latter may also be used to identify the proximity of the identified (e.g., based on PCI) MUEs in the CSG coverage when the location of HBS is known.

In addition to the received signal strength and channel response signatures listed above, the HBS may also determine the range of the transmitting UE based on the timing alignment information for UL transmissions of the HUEs to the HBS.

Over time the HBS can thus build a channel fingerprint database of received signal level (e.g., signal strengths, signal quality, etc) and corresponding channel responses indexed to the HUE range to the HBS for both the UL and DL.

The above measurements and the updating of the database may be performed, for example, periodically, whenever there are active HUEs, whenever the HBS physical location is changed and the HBS is able to identify this stimulus, upon receiving specific instructions from the subscriber, e.g., subscriber setting configuration via an application program, and by measurements acquired via minimization of drive test (MDT). They may also be obtained from an external source, e.g., from simulations based on a new HBS location and propagation predictions) or from logged data in a live network for the purpose of network development and planning.

The database can be stored/accessed locally on memory within the HBS or be stored remotely and accessed by the HBS when needed.

The measurement of the received signal strengths at the HBS can be achieved through a variety of techniques, including e.g., measurements of signal strength like reference signal received power (RSRP) and reference signal received quality (RSRQ) measurements for LTE implementations. In HSPA, the HBS may use common pilot indicator channel (CPICH) measurements (received signal code power (RSCP) and signal to noise ratio (Ec/No)).

The HBS (e.g., HeNB) may employ a measurement unit or module for performing the measurement on DL signals transmitted by a macro node (e.g., macro eNode B). The HBS performs one or more types of measurements. For example, the HBS measures signal strength on DL signal sent by the macro node such as shown in FIG. 3. An example of a DL signal is a DL reference signal (RS) such as a cell-specific reference signal. A corresponding measurement in LTE is RSRP. The second HBS radio measurement includes measurement on a MUE UL signal (M shown in FIG. 3) received by the HBS and used to determine if there is a MUE causing the uplink interference. Typically, a UE sends uplink signals scrambled with its serving cell PCI, and thus, the MUE transmits its uplink signal scrambled with the PCI of its serving macro node. A non-limiting example of such a signal may be a reference signal, e.g., sounding reference signals, data on the PUSCH in LTE, etc. In order to determine whether there is an interfering MUE, the HBS correlates the MUE uplink received signal (M) with the PCI of one or more identified macro nodes. If the MUE is detected, then the HBS measures the uplink received power from this detected MUE.

The HBS may test several PCIs. As a result, there may be one identified aggressor macro node serving its MUEs in the CSG coverage area. In a case when multiple aggressor macro nodes are identified, the HBS may, e.g., select the one whose MUEs have the worst signal quality (e.g., lowest signal to noise ratio (SNR) or SINR). Typically, these UEs are the closest to the HBS.

In one non-limiting aspect, regardless of whether the macro node is found, the HBS proactively and regularly correlates the uplink received signals over all PCIs or a group of PCIs to determine whether there is an MUE within its coverage area. Generally, the PCI(s) for an HBS are reserved so the HBS correlates over the PCIs which are not reserved for HBS. Otherwise, the HBS may have to check all PCIs to determine the presence of an MUE in its coverage area.

Figure 4:
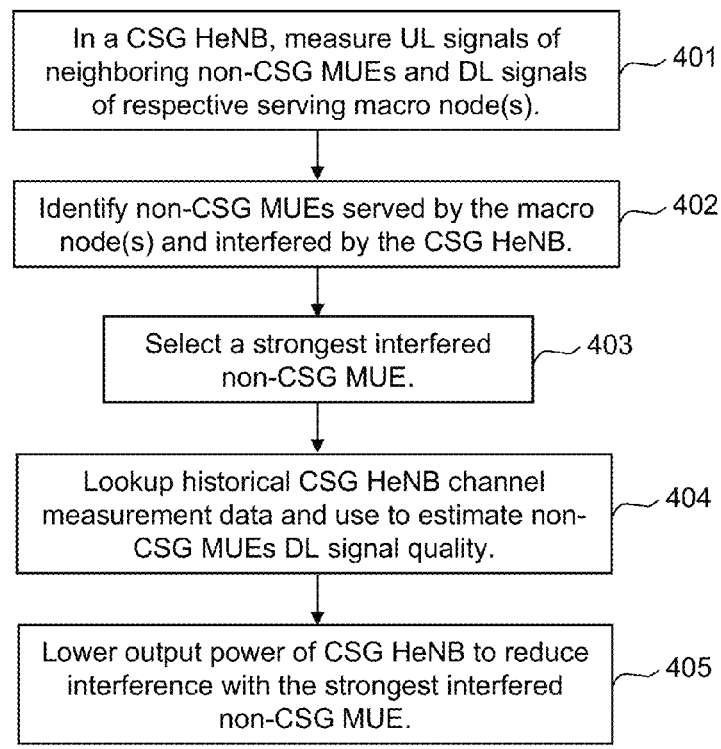
FIG. 4 is a non-limiting example flow chart illustrating modification of output power based on an estimated interference of multiple MUEs.

FIG. 4 illustrates a flow diagram of one non-limiting embodiment to reduce the interference effect of a closed subscriber group base station (CSG HeNB) on non-CSG MUEs served by neighboring radio network nodes. In step 401, in the CSG HeNB, a measurement is made of UL signals of neighboring non-CSG MUEs and DL signals of their respective service macro nodes. In step 402, in the CSG HeNB, non-CSG MUEs served by the macro nodes which are potentially interfered with by the CSG HeNB are identified. In step 403, a strongest (radio UL signal strength) non-CSG MUE is selected. In step 404, a lookup of historical CSG HeNB channel data (channel fingerprinting database) provides insight into the non-CSG MUE's DL signal quality. In step 405, the output power (radio transmission power) of the CSG HeNB is lowered to reduce interference with the selected strongest non-CSG MUE.

When the received signal strength of an MUE UL signal (M) is greater than some threshold (Threshold1) or the derived path loss, (the HBS may assume that the MUE transmits at the maximum transmit power in the UL or may estimate the MUE UL power based on the pre-defined power control formula for UEs and the estimated DL path loss between macro eNodeB and HBS from HBS's DL measurements of macro eNodeB signals and known transmit power of macro eNodeB), the HBS can determine that the MUE is within its coverage region and may also determine whether the HBS is approximately at the same distance from the macro eNB as is the MUE. For example, it may be assumed that if the received MUE UL signal (M) is strong enough (e.g., greater than some Threshold 2), then MUE is close to HBS, which may be used with another assumption that the DL received signal (A) measured at HBS may be similar to that seen by the MUE. As another example, it may be assumed that if the received MUE UL signal is strong enough (e.g., greater than some Threshold 1), then the MUE is within HBS coverage.

Another possible measurement used to recognize proximity of nodes and potential interference scenarios includes an acquisition of a physical cell identifier (e.g., PCI) of the macro node 101. The HBS can potentially detect more than one macro node. In that case, different criteria may be used to select a macro node for performing the DL measurements on the selected macro node(s). For example, the HBS may either select the strongest macro node or N strongest macro nodes for performing further actions/measurements as described earlier. The HBS may also decide to select a macro node or all macro nodes whose signal level (e.g., signal strength/quality) is above a threshold. Another option is that the HBS selects the macro node whose PCI matches with the one used by the MUE for uplink transmission. Again, the MUE is the MUE determined by the HBS within its cell coverage area.

Figure 5:
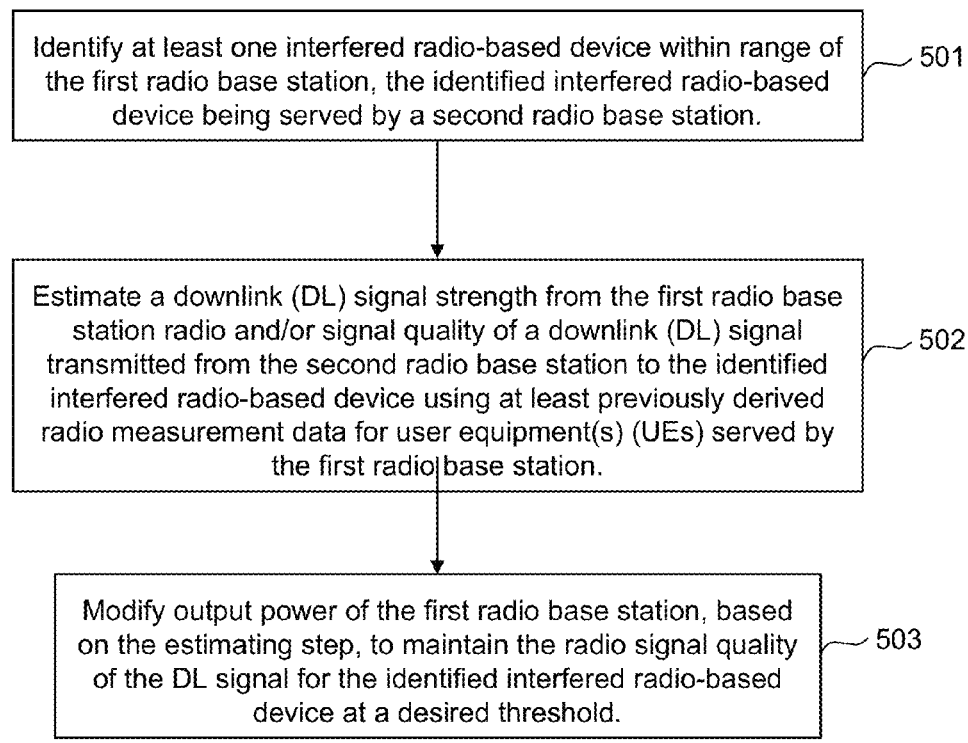
FIG. 5 is a non-limiting example flow chart illustrating modification of base station output power based on an estimated interference.

FIG. 5 illustrates a flow diagram of one non-limiting embodiment to reduce HBS interference on UEs served by neighboring base stations. In step 501, a first base station identifies at least one interfered radio-based device (e.g., UE) within range of the first radio base station, the identified interfered radio-based device being served by a second radio base station. In step 502, an estimate is made of radio signal strength and/or signal quality of a downlink (DL) signal transmitted from the second radio base station to the identified interfered radio-based device using at least previously derived radio measurement data (channel fingerprint database) for user equipment(s) (UEs) served by the first radio base station. In step 503, output power (radio signal transmission power) of the first radio base station is modified, based on the estimating step, to maintain the radio signal quality of the DL signal for the identified interfered radio-based device at a desired threshold.

Figure 6:
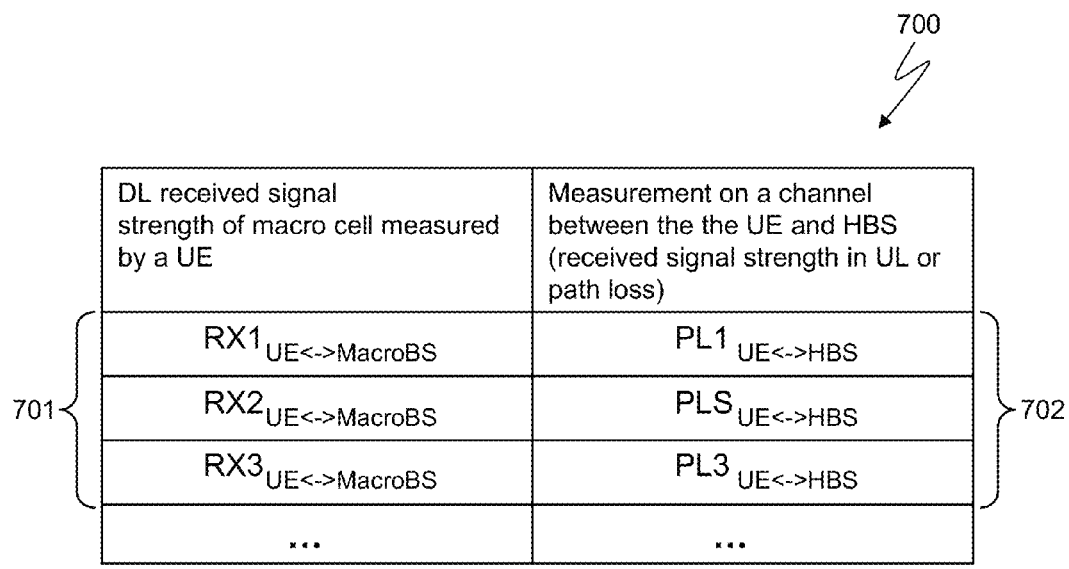
FIG. 6 is a non-limiting example table illustrating a channel fingerprint database.

Consider the following non-limiting example 1. A fingerprint database as shown in FIG. 6 retains a relationship between DL received signal strength of a macro cell measured by a UE and a measurement on a channel between the UE and an HBS, where the measurement may be, e.g., received signal strength (RX) 701 in the UL or path loss (PL) 702. The measurements may be collected to build statistics of such a relation.

Figure 7:
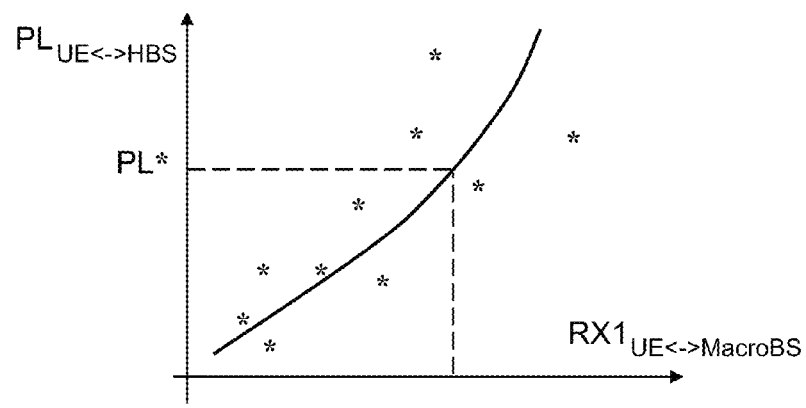
FIG. 7 is a non-limiting example chart illustrating estimation DL received strength based of on a regression analysis.

Based on the collected statistics, which may also be filtered if desired, e.g., to give a higher priority to the recent measurements, one may estimate one parameter from another one, e.g., PL when given the RX value. The estimation may be done by e.g., by using regression analysis techniques, building interpolation functions (as shown in FIG. 7 where an interpolation is made using the data of FIG. 6), or matching the measurements to the RF pattern etc. The estimated PL allows for estimating the DL received signal strength of HBS seen at MUE which may further be used in estimating the signal quality of macro BS signals at MUE.

Consider the following non-limiting example 2. When a MUE is located close to an HBS, the signal quality of a macro BS signal at MUE may be approximated in linear scale by, e.g., $S_{MacroBS \rightarrow HBS}/(I_{HBS}+S_{HBs \rightarrow Mue}-S_{MacroBS \rightarrow HBS}+\text{margin})$, where $s_{MacroBS \rightarrow HBS}$ is the received signal strength from Macro BS measured at HBS (approximates the received signal strength of the macro BS at MUE when MUE is close to HBS), $I_{HBS}$ is the total DL received signal power estimated at HBS (excluding own HBS received signal power), $S_{HBS \rightarrow MUE}$ is the estimated received signal of the HBS as seen at the MUE (e.g., as a product in linear scale of PL* obtained by interpolation and the HBS transmit power which is known to HBS), and margin is other compensation intended to improve the received signal quality estimation at MUE.

Consider the following non-limiting example 3. When the location of HBS is known (by any suitable means), the fingerprint database may also be used to predict the received signal characteristic such as received signal quality or estimate PL. The HBS position can be known by means of: pre-configuration, by a global navigation satellite system (GNSS) receiver (e.g., global positioning satellite (GPS)), HBS requesting the location information from the network (e.g. a macro node) or obtain its own the position. The HBS can then use this above information and also the location information of UEs stored in the fingerprint database for estimating the MUE DL quality based on the radio measurements. The location information may e.g. be used for predicting the received signal strength at the MUE for a signal received by the MUE from the HBS. When the HBS also knows the location of macro BS, it may also predict the received signal from macro BS at MUE or estimate this signal by RF matching (as in Example 1, with or without interpolation).

By using the measurements described above, the HBS can determine whether there are any strong MUEs are within the HBS vicinity. When one or more strong MUEs is found, the HBS uses one or more predetermined channel fingerprinting mapping table(s) as described above to estimate the DL signal quality of the MUE. A DL interfering signal (I) as seen by the MUE is also estimated. Using this channel fingerprint and the measured uplink MUE signal (M), the HBS can predict the range of the MUE from the HBS and the corresponding DL received signal strength of the interfering transmission I as seen by the non-CSG MUE.

With respect to HBS output power, the HBS uses the performed and/or derived radio measurements for setting its DL maximum output power. After estimating the DL signal quality of the MUE, the HBS adjusts its maximum output power (PMAX_HBS) accordingly. Furthermore, the HBS may adjust its power such that the estimated DL signal quality at the MUE meets a certain target value. The MUE DL quality may be determined as described above. The determined DL quality can be expressed as signal to interference ratio (S/I), signal to interference plus noise ratio (SINR), block error/erasure rate (BLER), packet error rate, etc.

The HBS maximum output power is lowered until the MUE DL estimated signal quality (e.g., SINR) is greater than a second threshold (Threshold2), which allows the MUE to achieve a target throughput level on the DL. The HBS also increases or restores the maximum output power when there are no MUEs or when the MUE DL estimated signal quality is above the desired threshold.

The HBS may regularly execute one or more of the steps and procedures described above. These steps and procedures may be performed periodically or triggered, e.g., upon identifying strong interference in the UL at the HBS.

The fingerprinting database and the methodology described above may be employed dynamically as the HBS adjusts it transmit power in order to track randomly varying channel conditions and MUE mobility. The technology described may also be used by the HBS for adjusting its maximum output power to protect HUEs served by other CSG HBSs.

Figure 8:
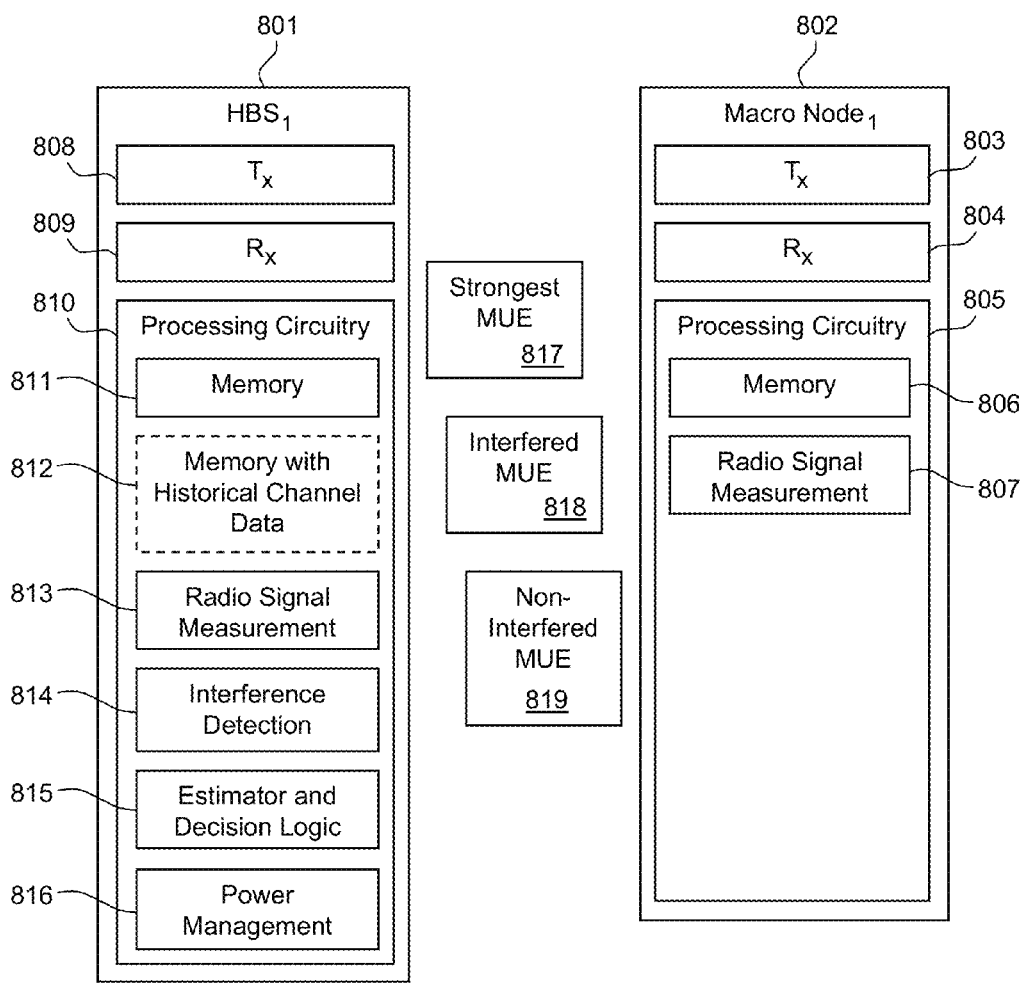
FIG. 8 is a non-limiting example system diagram illustrating function block elements used to modify the output power of a base station based on an estimated interference of multiple MUEs.

FIG. 8 illustrates a non-limiting example system diagram illustrating elements used to modify the output power of a base station based on an estimated interference to multiple MUEs. It should be understood that the delineation of specific elements is not intended to limit the configuration and functions of the described base station and node. Known and future elements and functions of base station and node technology are considered within the scope of the base station and nodes described herein.

In this non-limiting example, home base station (HBS$_1$ 801), for example, CSG HeNB, includes well known base station elements, such as a transmitter 808 and receiver 809 and processing circuitry 810 with memory 811. Historical channel data may be stored locally in memory 812 within the base station or be retrieved from remote storage (e.g., in a cloud or remote server storage). Processing circuitry 810 is additionally configured to provide radio signal measurement 813, interference detection 814, estimator and decision logic 815, and power management 816. Macro node (Macro Node$_1$ 802) includes well known macro node elements, such as a transmitter 803 and receiver 804 and processing circuitry 805 with memory 806, and radio signal measurement element 807. Various MUEs (e.g., non-CSG) may be located between macro node$_1$ 802 and HBS$_1$ 801. For example, MUE 819 near the macro node$_1$, but not within the cell coverage area of HBS$_1$ 801, is not interfered with. MUEs 817 and 818 are in an interfering environment with HBS$_1$ 801, with 817 representing a strongest MUE. Using the technology described herein, HBS$_1$ 801 will adjust its output power to ensure at least MUE 817 receives a quality DL signal from Macro Node$_1$ 802.

The technology described herein allows an HBS to autonomously and dynamically adjust its transmit power in an accurate manner to ensure that a non-HBS MUE in close proximity to or within the HBS coverage region is still able to achieve a target DL throughput. It also enables deployment of HBS's without compromising the performance of the underlying macro node network. This is achieved by accurately estimating the actual signal to interference level seen by the MUE and does not rely on prescriptive power control algorithms that are only accurate for the empirical use cases for which they are benchmarked.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail

The invention claimed is:

1. A method in a first radio network node (HBS) transmitting a radio signal at a first output power level in a first cell, the method comprising the steps of:
    performing one or more radio measurements in the first cell on an uplink (UL) radio signal transmitted by one or more user equipments (UEs) served by a second radio network node and on a downlink (DL) radio signal transmitted by the second radio network node,
    identifying one of the one or more UEs served by the second radio network node that experiences interference from a DL transmission from the first radio network node based on the one or more performed radio measurements,
    estimating an interference experienced by the identified UE caused by the DL transmission from the first radio network node based on the one or more performed radio measurements, and
    modifying the first output power level of the first radio network node based on the estimated interference to reduce the interference from the first radio network node experienced by the identified UE.

2. The method of claim 1, wherein the estimating is also based on historical radio data obtained for the first cell.

3. The method of claim 2, wherein the historical radio data for the first cell comprises signal strength and/or signal quality measurements experienced by UEs served by the first radio network node.

4. The method of claim 2, further comprising creating the historical radio data for the first cell by aggregating over time one or more of the following data:
    one or more measurements related to UL signals transmitted by UEs served by the first radio network node;
    one or more measurements related to DL signals for UEs served by the first radio network node;
    one or more measurements related to DL signals for UEs served by neighboring network nodes;
    measurements related to DL signals for UEs served by the second radio network node, or
    positioning information of UEs served by the first radio network node.

5. The method of claim 2, further comprising dynamically maintaining the historical radio data for the first cell in a database by periodic updating.

6. The method of claim 5, further comprising updating the historical radio data for the first cell based on any of the following triggers:
    a periodic update initiated by the first radio network node,
    identification of an active UE served by the first radio network node,
    detecting a change in physical location or geographical proximity of the first radio network node,
    the first radio network node receiving instructions to update, and
    the first radio network node receiving historical radio data for the first cell generated externally to the first radio network node.

7. The method of claim 6, wherein the externally generated historical radio data for the first cell comprises simulations of signal strength and/or signal quality measurements associated with UEs served in the first radio network node based on location data and/or logged data.

8. The method of claim 2, wherein the historical radio data comprises a fingerprint database storing a historical relationship of: measured neighboring radio network nodes' DL signals received by UEs served by the first radio network node and signals between UEs served by the first radio network node and the first radio network node.

9. The method of claim 1, wherein the estimating step includes one or more of: performing a regression analysis, building one or more interpolation functions, or matching the measurements to an RF pattern.

10. The method of claim 1, wherein reducing first radio network node interference experienced by the identified interfered UE served by the second radio network node includes setting one or more threshold targets to maintain a specified quality of a DL signal transmitted by the second radio network node and received by the identified interfered UE.

11. The method of claim 1, wherein the first radio network node is a home base station serving a closed subscriber group (CSG) and the second radio network node is a macro base station and the identified interfered UE is a macro base station user equipment (MUE) served by macro base station and not part of the closed subscriber group.

12. The method of claim 1, wherein the first radio network node is a low power home base station and the identified UE is a macro base station user equipment (MUE) not served by the low power home base station.

13. The method of claim 1, further comprising the first radio network node:
identifying a first cell identifier associated with the first radio network node associated with a first class of radio network nodes and a second cell identifier associated with the identified UE;
comparing the first cell identifier to the second cell identifier; and
determining if the second radio network node belongs to a second class of radio network nodes based on the comparing step.

14. The method of claim 13, wherein the second class of radio network nodes is a higher-output power class as compared to the first class of radio network nodes.

15. The method of claim 13, wherein the second class of radio network nodes comprises wide area radio base stations.

16. The method of claim 13, wherein the identifying step further comprises identifying a second cell identifier based on reading the broadcast channel or performing measurements on downlink signals transmitted by the second radio network node.

17. The method of claim 1, wherein the identifying step is repeated for a plurality of interfered UEs followed by a selecting step to select a specific interfered UE from the plurality of interfered UEs based on a measured, low quality (SNR or SINR), downlink (DL) radio signal below a defined threshold that is transmitted by the second radio network node.

18. The method of claim 1, wherein the identifying step is repeated for a plurality of interfered UEs followed by a selecting step to select a specific interfered UE from the plurality of interfered UEs based on measurements in the first cell on an uplink (UL) radio signal transmitted by one or more user equipments (UEs) served by the second radio network node.

19. The method of claim 1, wherein the step to modify a first output power of the first radio network node is discontinued when interference to the identified UE is below a threshold.

20. A first radio network node (HBS,) transmitting a radio signal at a first output power in a first cell comprising processing circuitry configured to:
perform radio measurements in the first cell on an uplink (UL) radio signal transmitted by one or more user equipments (UEs) served by a second radio network node that neighbors the first radio network node and on a downlink (DL) radio signal transmitted by the second radio network node,
identify one of the one or more UEs served by the second radio network node and interfered with by a DL transmission from the first radio network node based on the one or more radio measurements,
estimate an interference experienced by the identified interfered UE caused by the DL transmission from the first radio network node based on the one or more performed radio measurements and historical radio data for the first cell, and
modify the first output power of the first radio network node based on the estimated interference to reduce first radio network node interference experienced by the identified interfered UE.

21. The first radio network node of claim 20, wherein the estimate is also based on historical radio data obtained for the first cell.

22. The first radio network node of claim 21, wherein the historical radio data for the first cell comprises signal strength and/or signal quality measurements experienced by UEs served by the first radio network node.

23. The first radio network node of claim 21, wherein the processing circuitry is further configured to:
create the historical radio data for the first cell by aggregating over time one or more of the following data:
one or more measurements related to UL signals transmitted by UEs served by the first radio network node;
one or more measurements related to DL signals for UEs served by the first radio network node;
one or more measurements related to DL signals for UEs served by neighboring network nodes;
measurements related to DL signals for UEs served by the second radio network node, or
position information of UEs served by the first radio network node.

24. The first radio network node of claim 21, wherein the processing circuitry is further configured to dynamically maintain the historical radio data for the first cell in a database by periodic updating.

25. The first radio network node of claim 24, wherein the processing circuitry is further configured to update the historical radio data for the first cell based on any of the following triggers:
a periodic update initiated by the first radio network node,
identification of an active UE served by the first radio network node,
detecting a change in physical location or geographical proximity of the first radio network node,
the first radio network node receiving instructions to update, and
the first radio network node receiving historical radio data for the first cell generated externally to the first radio network node.

26. The first radio network node of claim 25, wherein the externally generated historical radio data for the first cell comprises simulations of signal strength and/or signal quality measurements associated with UEs served in the first radio network node based on location data and/or logged data.

27. The first radio network node of claim 21, wherein the historical radio data comprises a fingerprint database storing a historical relationship of: measured neighboring radio network nodes' DL signals received by UEs served by the first radio network node and signals between UEs served by the first radio network node and the first radio network node.

28. The first radio network node of claim 20, wherein the estimate includes one or more of: performing a regression analysis, building one or more interpolation functions, or matching the measurements to an RF pattern.

29. The first radio network node of claim 20, wherein the first radio network node is a home base station serving a closed subscriber group (CSG) and the second radio network node is a macro base station and the identified interfered UE is a macro base station user equipment (MUE) served by macro base station and not part of the closed subscriber group.

30. The first radio network node of claim 20, wherein the first radio network node is a low power home base station and the identified UE is a macro base station user equipment (MUE) not served by the low power home base station.

31. The first radio network node of claim 20, wherein the processing circuitry is further configured to:
- identify a first cell identifier associated with the first radio network node associated with a first class of radio network nodes and a second cell identifier associated with the identified UE;
- compare the first cell identifier to the second cell identifier; and
- determine if the second radio network node belongs to a second class of radio network nodes based on the comparison.

\* \* \* \* \*

UNITED STATES PATENT AND TRADEMARK OFFICE
CERTIFICATE OF CORRECTION

| | |
|---|---|
| PATENT NO. | : 8,848,561 B2 |
| APPLICATION NO. | : 13/384854 |
| DATED | : September 30, 2014 |
| INVENTOR(S) | : Siomina et al. |

It is certified that error appears in the above-identified patent and that said Letters Patent is hereby corrected as shown below:

In the claims

In Column 13, Line 6, in Claim 8, delete "first" and insert -- second --, therefor.

In Column 15, Line 2, in Claim 27, delete "the first" and insert -- the second --, therefor.

Signed and Sealed this
Fifteenth Day of March, 2016

Michelle K. Lee
*Director of the United States Patent and Trademark Office*